FIG. 1

INVENTORS
ROY F. DEHN &
WILLIAM E. WARD
BY Hudson, Boughton,
Williams, David & Hoffmann
ATTORNEYS

INVENTORS
ROY F. DEHN &
WILLIAM E. WARD
BY Hudson, Boughton,
Williams, Davidt Hoffmann
ATTORNEYS

INVENTORS
ROY F. DEHN &
WILLIAM E. WARD

United States Patent Office 2,947,273
Patented Aug. 2, 1960

2,947,273
DOUBLE ACTION DRAWING PRESS

Roy F. Dehn, Wickliffe, and William E. Ward, Shaker Heights, Ohio, assignors to The Cleveland Crane & Engineering Company, Wickliffe, Ohio, a corporation of Ohio Filed July 23, 1953, Ser. No. 369,753

3 Claims. (Cl. 113—46)

The present invention relates to crank-operated presses and the like, particularly adapted for deep drawing operations.

The principal object of the present invention is the provision of a new and improved double action drawing press having blank holder and die slides reciprocated by a crank or eccentric means driven by a motor, the press being so constructed and arranged that the die slide is moved through its drawing stroke at a relatively slow and uniform rate even though the press is operated at a relatively high rate of speed inasmuch as the drawing stroke occurs through substantially more than 180° of each cycle, and the blank holder slide is moved by a toggle mechanism to operatively engage the work blank just prior to the commencement of the working portion of the drawing stroke and remains in the down position until after the die slide commences its return stroke.

A further object of the present invention is the provision of a new and improved double action drawing press having blank holder and die slides adapted to be reciprocated toward and away from the press bed by crank or eccentric means driven by a motor, the motor and associated means for reciprocating the slides being located in the crown of the press and supported by fixed parts of the press.

The invention resides in certain constructions and combinations and arrangements of parts and further objects and advantages will be apparent to those skilled in the art to which it relates from the following description of the preferred embodiment described with reference to the accompanying drawings forming a part of this specification in which.

Figure 5:
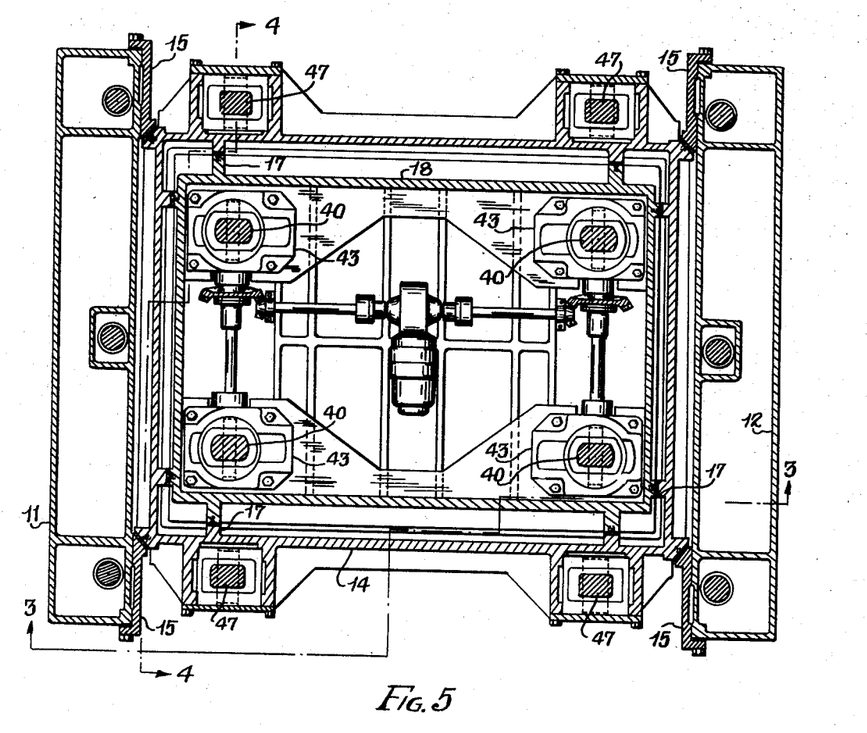
Fig. 5 is a sectional view taken approximately along line 5—5 of Fig. 1.

The invention is susceptible of various modifications and constructions and of use in various types of presses including underdrive presses. For purposes of illustration it is shown embodied in a four-point double action drawing press including a frame of conventional construction having a bed 10, two uprights 11, 12 on opposite sides of the bed, and a crown structure 13. A rectangular blank holder or hold-down slide 14 is adapted for reciprocable movement between the uprights 11, 12 and is guided by gibs 15 mounted on the uprights 11, 12 and engaging the corners of the slide. The blank holder slide 14 may be of usual construction having a generally rectangular opening therethrough and provided with internal, vertical slideways 17 on which a rectangular die slide 18 is adapted to reciprocate relative to the blank holder slide as is best illustrated in Fig. 5. The die slide may be of any suitable construction well-known in the art and is adapted to have a forming die attached thereto to cooperate with a die on the press bed to deep draw metal forms from metal blanks. The dies are not shown since they do not form part of the present invention and may be of any desired form, nor are the die cushions or counterbalancing devices shown since they are well-known in the art and are not necessary to an understanding of the invention.

Figure 6:
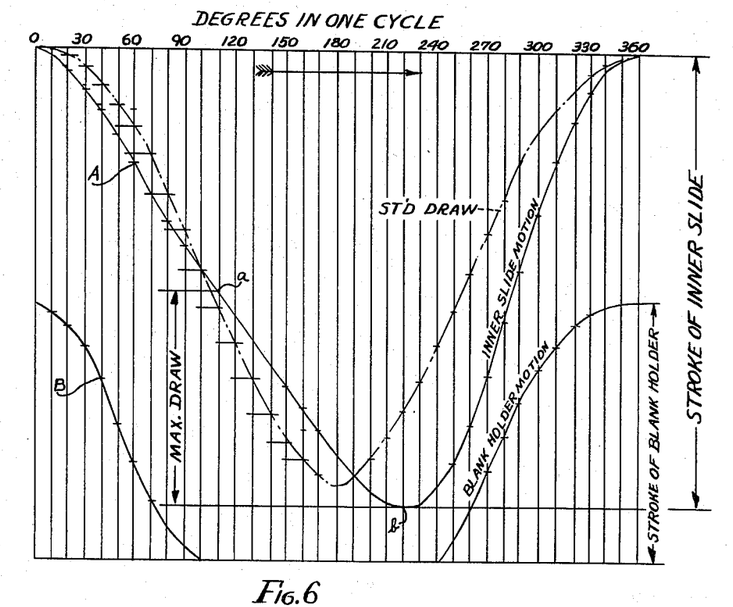
Fig. 6 is a graph illustrating the relative movements of the die slide and blank holder of the improved double action press and the relative movement of the die slide of a conventional crank operated press.

The slides 14, 18 are actuated by means located in the crown 13 in such a manner that the blank holder slide engages the work positioned on the press bed just prior to the commencement of the work portion of the drawing stroke, i.e. the engagement of the die on the die slide with the metal blank, and remains in its hold-down position until after the die slide has commenced its return movement to thereby assure stripping of the formed metal from the forming die. The relative movements of the die and blank holder slides are shown by line A, B respectively in Fig. 6. The point $a$ represents the beginning of the work portion of the die slide stroke when maximum draw is employed and $b$ represents the bottom of the drawing stroke.

Figure 1:
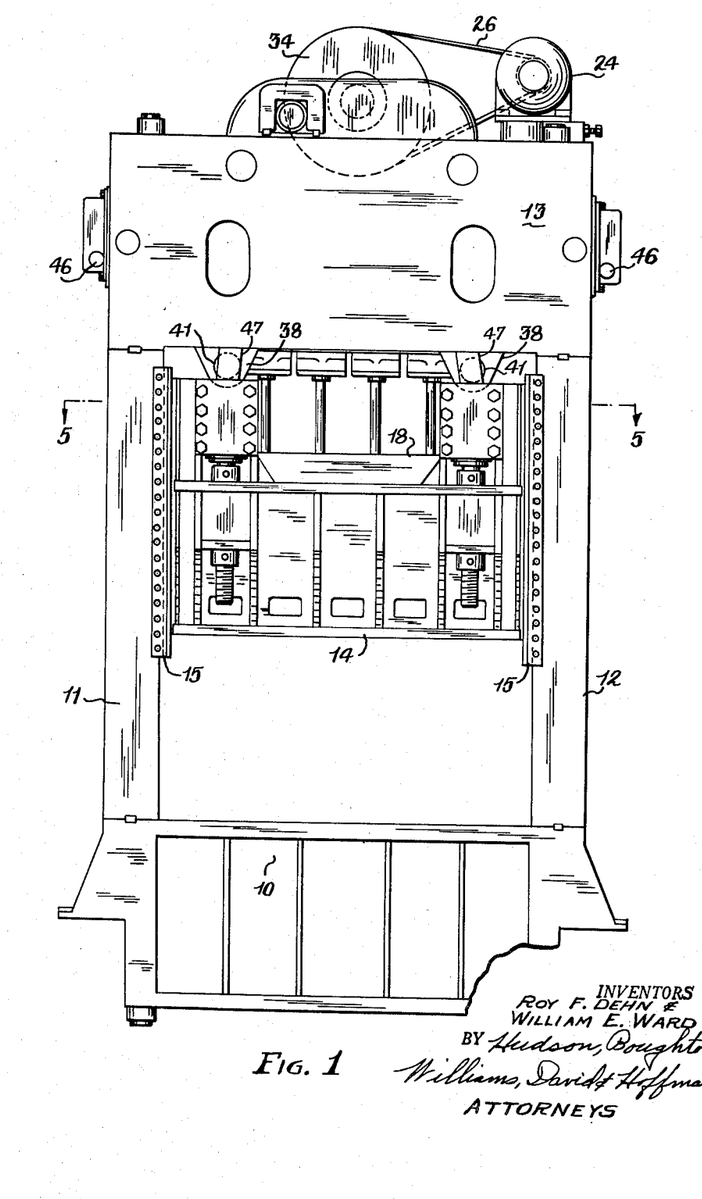
Fig. 1 is a side elevational view of a double action press embodying the invention.
Figure 2:
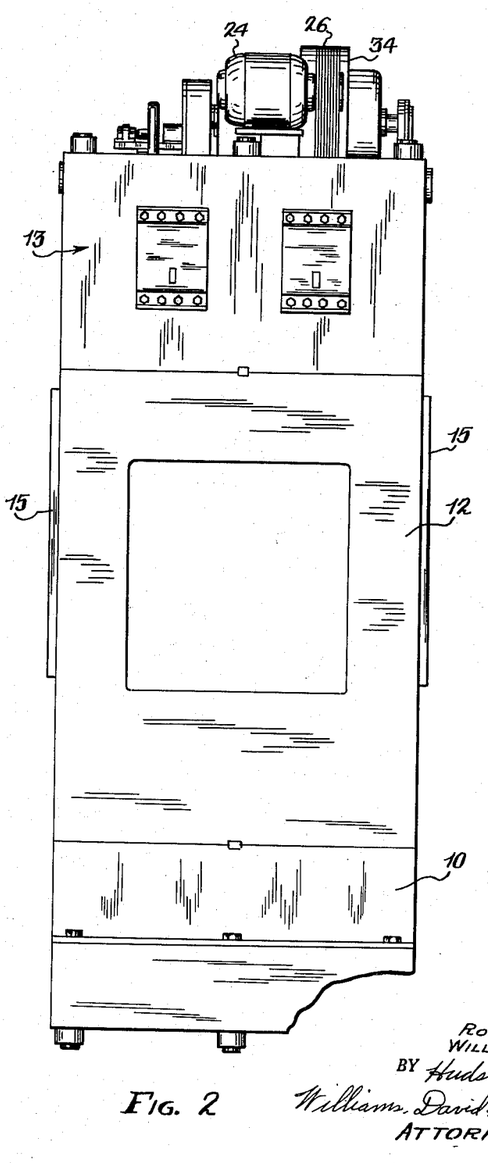
Fig. 2 is a front elevational view of the double action press.
Figure 3:
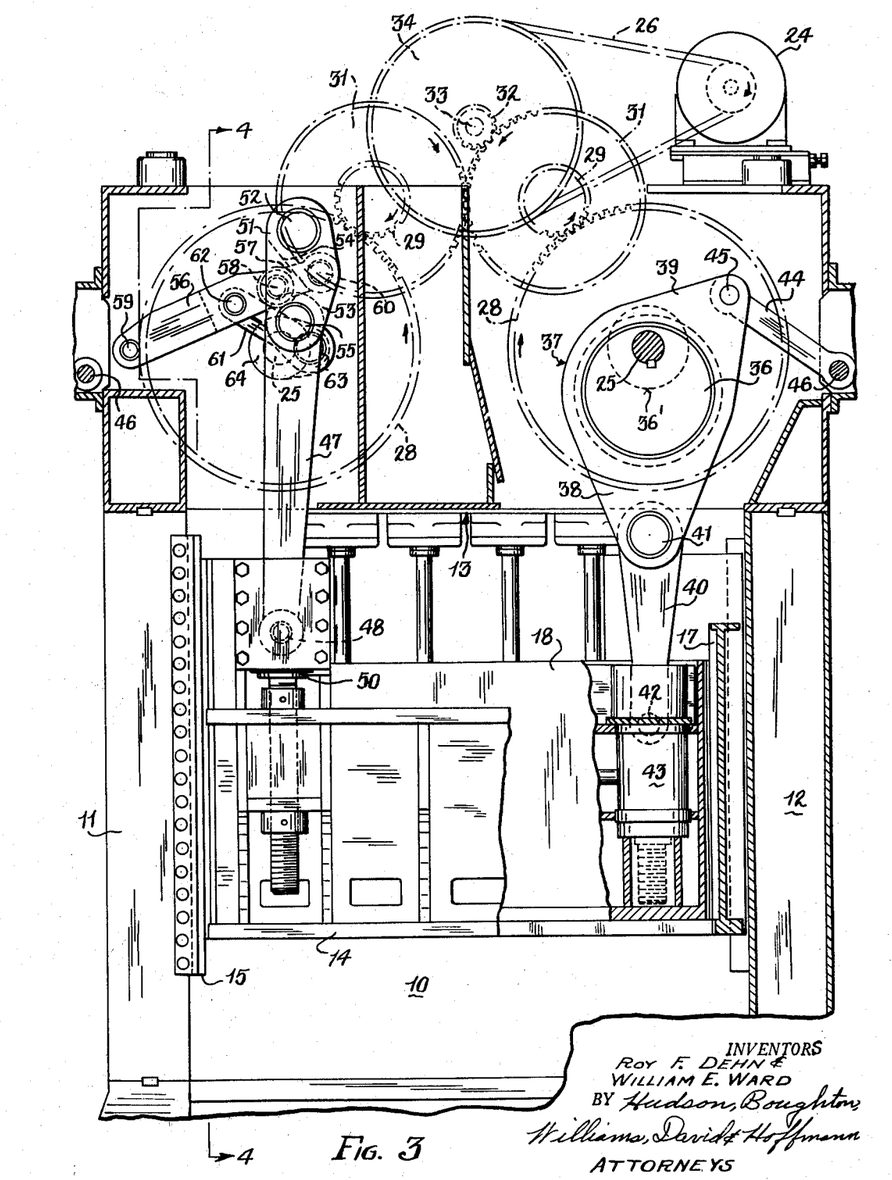
Fig. 3 is a side view of the upper portion of the press, certain parts being shown in section.
Figure 4:
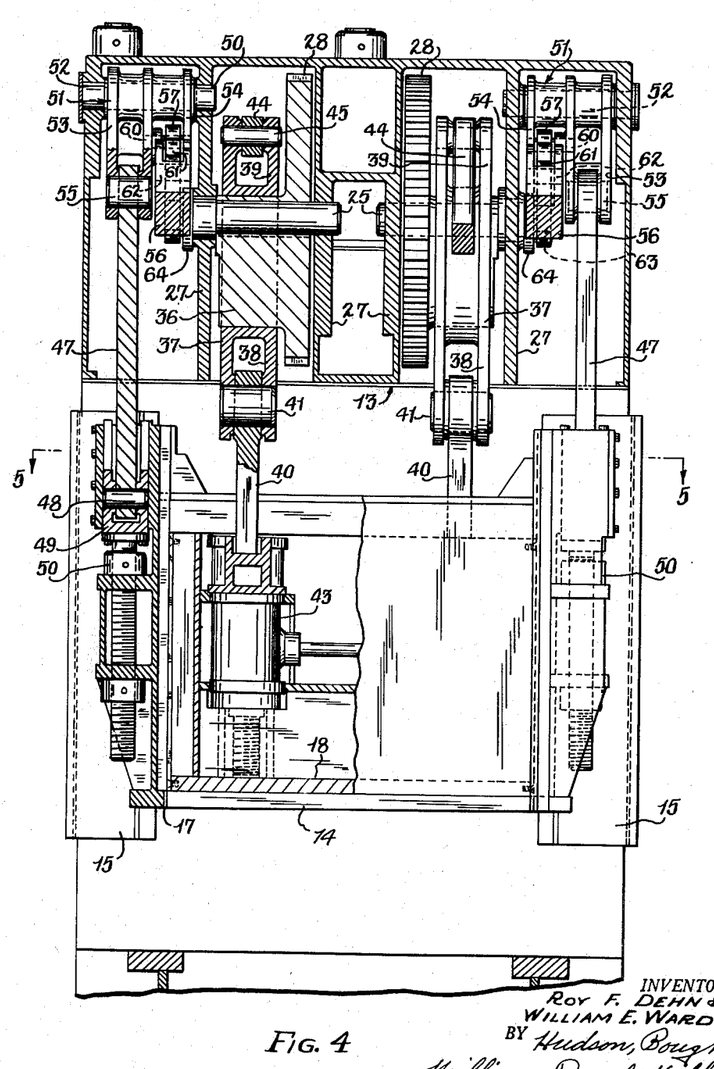
Fig. 4 is a sectional view taken approximately along line 4—4 of Fig. 5 with parts in elevation.

A mechanism for operating the slides 14, 18 comprising a motor 24 which drives four horizontal shafts 25 through a belt drive 26 and suitable gearing, which will be described, is located in the crown of the press. The shafts 25 are journaled in intermediate longitudinal walls 27 in the crown 13 and are positioned transversely of the crown in front and back pairs, the shafts of each pair being in spaced end-to-end alignment. The back pair of shafts 25 is illustrated in Fig. 4, it being understood that the other or front pair is located forwardly of, and parallel to, those shown. The side view of the press in Fig. 3 shows the front and back shafts 25 which are on the left-hand side of the press. In referring to back, front etc., the front of the press is considered as that side which is viewed in Fig. 2 and which is the same as viewing the press from the right side of Fig. 1.

The inner end of each shaft 25 is provided with a bull gear 28, each bull gear being in mesh with a driving pinion 29. The driving pinions 29 for the rear pair of gears 28 are mounted on a common transverse shaft in the crown 13 as are the pinions 29 for the front pair of shafts 25. Each of the two shafts for the pinions 29 is driven by a gear 31 mounted thereon, the gears 31 being in mesh with each other so that they rotate in opposite directions. One of the gears 31 is driven by a pinion 32 mounted on a horizontal drive shaft 33 and connected by a suitable clutch mechanism to a flywheel 34 driven by the belt drive 26. The clutch mechanism for connecting the drive shaft 33 to the flywheel 34 is not shown since it can be of any well-known construction having control means to effect a single rotation of the shafts 25 each time a pedal or other control member is actuated by the press operator. During the operation of the press, the flywheel is rotated continuously by motor 24. The shafts for the pinions 29 and the shaft 33 are suitably journaled in bearings in the crown structure 13 which for the sake of clarity are not shown since the structure is well-known in the art.

The rotation of shafts 25 operates the blank holder and die slides through linkages and mechanisms to be described. The mechanism and linkages associated with each shaft 25 are the same, and, for the sake of clarity, the following description will be directed toward the mechanism and linkages associated with one of the shafts 25, it being understood that there are three others in the illustrated embodiment.

Mounted on each shaft 25 is an eccentric 36 which may be integral with the bull gear 28 which drives the shaft, as illustrated in Fig. 4. The eccentric 36 has a bell crank or eccentric strap 37 journaled thereon which includes bifurcated arms 38, 39, the arms 38, 39 defining an obtuse angle.

The arm 38 is pivotally attached to a link 40 by a pin 41, as shown in Fig. 3. The lower end of link 40 is pivotally attached to the die slide 18 by a pin 42 at a point on a side of the slide adjacent to a corner. As is common practice, an adjusting mechanism 43 is provided between the die slide and the link 40 so that the exact stroke required for the various dies may be easily obtained. It will be understood that there are four links 40 and that one is connected adjacent to each corner of the die slide.

The arm 39 of the strap 37 is pivotally attached to one end of a link 44 by a pin 45, the other end of the link being anchored by a pin 46 to the press frame. It is apparent from the above that as the eccentric 36 is rotated by the gear 28 the link 44 causes the strap 37 to oscillate thereby shifting the toggle joint pin 41 in such a manner as to cause the die slide 18 to move at a relatively slow and uniform rate in its downward or drawing stroke and to move rapidly in its return stroke, as is illustrated by the graph in Fig. 6. It will be seen that the draw stroke occurs during approximately 220° rotation of the eccentrics 36 while the return stroke occurs in approximately 140° of rotation of the eccentric.

Figure 9:
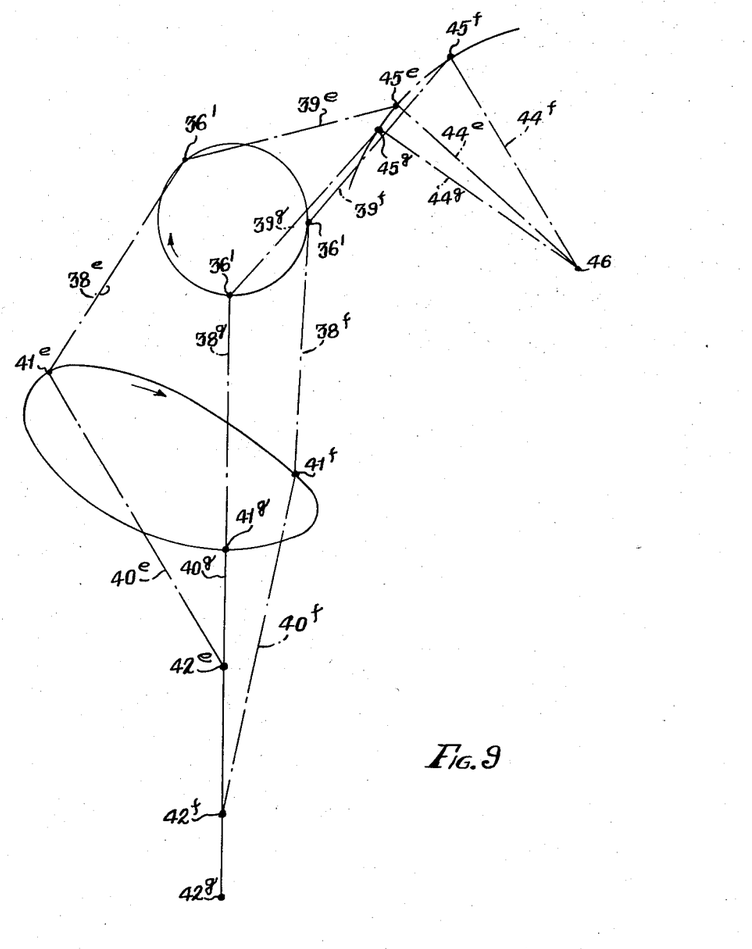
Fig. 9 is a schematic view showing the action of the die slide actuating linkage in three different positions.

Fig. 9 illustrates different positions of the die slide 18 and the relative positions of its actuating mechanism during a drawing stroke, the elements being indicated by appropriate reference characters having suffixes which indicate the different positions of the elements and the corresponding positions of the die slide. It is apparent from Fig. 9 that when the eccentric 36 is rotated the pivoted connection of its strap arm 38 and link 40 is constrained to move along a closed elongated loop by the link 44 which causes the outward end of the eccentric strap arm 39 to move along an arc. The elongated loop defined by the movement of the pivoted connection of the arm 38 and the link 40, has its length generally transverse to the line of movement of the lower end of the link 40, the excursion of the pivoted connection to one side of this line in defining the loop being greater than its excursion to the other side of the line. The lower end of link 40 moves away from the loop for substantially more than 180° of each revolution of the eccentric. The eccentric strap 37 may be considered as a pivotal rocker having two offset connecting points connected to the ends of arms 38, 39 respectively and a pivot point 36' which is moved in a circular path by the eccentric 36 or any other suitable means.

Figure 7:
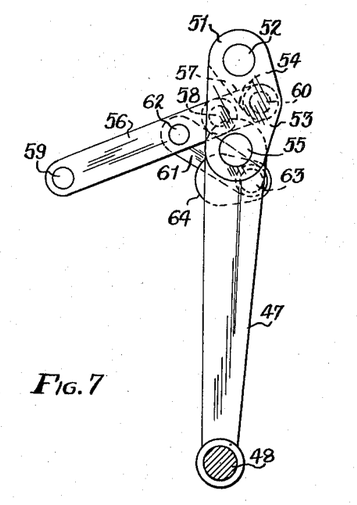
Fig. 7 is an elevational view showing the operating linkage of the hold-down slide when the slide is in its down position.
Figure 8:
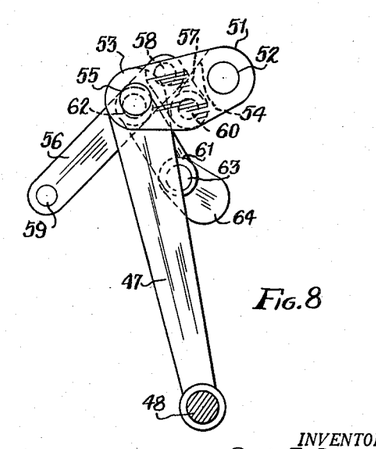
Fig. 8 is an elevational view showing the operating linkage for the hold-down slide when the slide is at the upper extremity of its stroke.

The blank holder slide 14 is actuated in timed relation to the movement of die slide 18 by four links 47 each one being pivotally connected adjacent to one corner of the slide by pins 48 supported in the yoke 49 of a conventional screw type adjusting device 50 attached to the slide 14 so that the slide can be adjusted relative to the links to obtain the desired length of stroke of the blank holder slide. The upper ends of the links 47 are attached to individual rockers 51 which are pivoted on pins 52 fixedly attached to the crown structure 13. The rockers 51 each have bifurcated arms 53, 54 which are offset from one another, as seen in Figs. 7 and 8, and which define an acute angle with each other. The links 47 are pivotally attached to the respective arms 53 by pins 55.

The blank holder slide 14 is operated from shaft 25, each shaft being operatively connected to one of the rockers 51. Since the construction of the linkages between the shafts 25 and the rockers 51 is the same for all four sets of shafts and rockers, only one will be described in detail, it being understood that there are four present in the illustrated embodiment.

The rocker 51 is oscillated by a toggle mechanism comprising members 56, 57 pivotally connected by a pin 58. The member 56 is pivotally attached to the frame of the press by a pin 59 and the member 57 is pivotally attached to arm 54 of rocker 51 by a pin 60. The toggle members 56, 57 are moved from one side of dead center to the other to swing or oscillate the rocker 51 by a connecting rod 61, one end of which is connected by a pin 62 to the toggle member 56 and the opposite end of which is attached to a crank pin 63 of a crank 64. The crank 64 is attached to the outer end of its corresponding shaft 25 as may be seen in Fig. 4.

The length of the connecting rod 61 and the relative angular position of rocker 51 and crank 64 is such that when the crank is in the position shown in Fig. 8 the toggle linkage is in its upper extreme broken position and the rockers hold the slide 14 in the raised position. When the crank 64 rotates as the press starts a drawing operation, the crank drops the toggle members 56, 57 toward a straight line position swinging the rocker 51 to lower the blank holder slide 14. As the toggle members approach and enter dead center, illustrated in Fig. 9, the linkage comprising connecting rod 61 and the crank 64 is likewise moving through dead center as well as the linkage comprising toggle member 57 and rocker arm 54. This causes the rocker to be practically motionless and the blank holder slide to dwell in engagement with the work during approximately 130° of rotation of the cranks. The relative positions of crank 64, eccentric 36, and strap 37 are such that the blank holder slide 14 is moved downwardly to engage the work on the bed of the press slightly ahead of the downward movement of the die slide 18, as may be clearly seen in Fig. 6. During the time the die slide is moving through its drawing stroke the crank 64 is moving through its arc which imparts practically no movement to the rocker 51 for the reasons pointed out hereinbefore. The blank holder is moved upwardly after the die slide commences its upward stroke to assure stripping of the metal from the die on the die slide.

For purposes of illustrating the relative sizes and positions of the various elements of the mechanism for actuating the blank holder slide 14 and the die slide 18, it is assumed that the press shown in the drawings has a die slide stroke of twenty-seven inches and a blank holder slide stroke of fifteen and one-half inches. The centers of the eccentrics 36, indicated at 36', are offset nine inches from the centers of their respective shafts 25 so that the eccentrics have a throw of eighteen inches. The length of each arm 38 of the straps 37 measured from the center of its respective eccentric to the center of pin 41 is thirty and five-eighths inches, and the length of each arm 39 from the center of its respective eccentric to the center of pin 45 is twenty-seven inches. The length of the link 40 between the centers of pins 41, 42 is forty-one and one-half inches. The length of each link 44 between the centers of pins 45, 46 is twenty-eight and three-quarter inches, and the center of each pin 46 is five inches below a horizontal line through the center of its corresponding shaft 25 and is forty-two and one quarter inches from a vertical line through the center of the shaft. It will be understood that the stroke of the die slide 18 could be changed while maintaining the relative positions and dimensions of the parts approximately as described.

As mentioned previously, the stroke of the blank holder in the form shown is fifteen and one-half inches and to provide this stroke, the length of each arm 53 of rockers 51 as measured between the centers of pins 52 and 55 is nineteen and one-half inches and the length of each link 47 between the centers of its pins 48, 55 is 65.719 inches. The center of each pin 52 is nineteen and one-half inches above the horizontal line through the center of its corresponding crank 64 and four inches from a vertical line through the center of the crank toward the center of the press as viewed in Fig. 3. The length of each toggle member 56 measured between the centers of pins 58, 59 is thirty-five and one-half inches and the length of each toggle member 57 measured between the centers of pins 58, 60 is nine inches. The center of pin 59 is on the horizontal line through its corresponding crank 64 and thirty-three and one-half inches from the crank centers.

The throw of crank 64 is approximately twelve and one-half inches and the length of each rod 61 measured between the centers of its pivot pins 62, 63 is eighteen inches and the center of pin 62 lies in line with the centers of pins 58, 59 of the respective toggle members 56 and is twenty-six inches from the center of pin 59.

Figure 10:
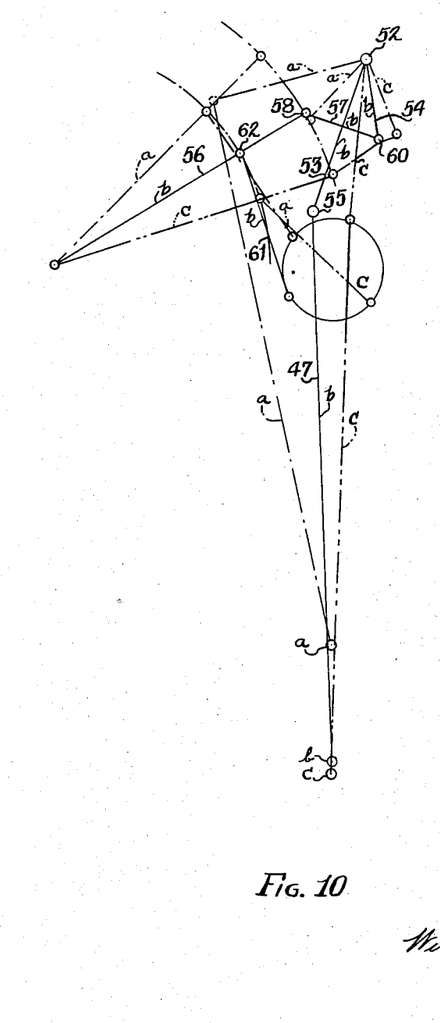
Fig. 10 is a view similar to Fig. 9, but showing the hold-down slide operating linkage in three different positions.

Figures 9 and 10 illustrate various or relative positions of the members of the linkages for operating the two slides based on the dimensions as set out above for purposes of illustration.

The improved press provides a double acting drawing press in which the die slide is powered by a crank or eccentric and has a uniform and relatively slow movement during the drawing portion of its stroke and a relatively quick return movement whereby the number of drawing operations per minute may be greatly increased over those of a conventional crank operated die slide press having the same stroke. By providing a relatively slow drawing stroke the drawing speed of the die slide is maintained within the maximum permissible drawing speed of the metal to be drawn although the operating crank is rotated at a much higher rate than the crank of a conventional drawing press of the same stroke. The improved press also provides in combination therewith a blank holder slide having a dwell whereby the slide engages the metal to be drawn just prior to and shortly following the relatively slow drawing stroke of the die slide.

It is apparent that the objects enumerated as well as others have been attained and that a new and improved press of the character referred to has been provided which materially increases the speed of operation of metal drawing operations over conventional crank operated presses without exceeding permissible drawing speeds and having a blank holder slide operable with the die slide to hold the work during the entire drawing stroke.

While we have illustrated the invention as embodied in a four-point press it will be readily apparent to those skilled in the art that it is suitable for use in a single point or other type press, and it is to be understood that other forms, adaptations and constructions could be employed which fall within the spirit of the present invention and the scope of the claims which follow.

Having thus described our invention, we claim:

1. In a double action press, a frame, a die slide reciprocable in said frame, a blank holder reciprocable relative to said die slide, a shaft rotatably supported by said frame for rotation about a fixed axis, means to reciprocate said die slide along a line comprising an eccentric member connected to and rotated by said shaft and an eccentric strap cooperating with said eccentric member and having two connecting points offset from the center of the eccentric member, means for rotating said shaft, a first link pivotally connected at one end to one of said connecting points and at the other end to said die slide, a second link pivotally connected at one end to said frame and at the other end to the other of said connecting points for constraining the latter to move through a circular arc about the connection of said second link to said frame and the said one connecting point to move through a closed elongated loop upon the rotation of said eccentric member, the length of said loop being generally transverse to the line through the center of rotation of said eccentric member and the connection of said slide to said first link whereby the die slide is moved in a direction away from said loop for substantially more than 180° of each revolution of said eccentric member, means for reciprocating said blank holder comprising a rocker pivotally connected to said frame, a link pivotally connected at one end to a first point on said rocker and at the other end to said blank holder, a toggle linkage comprising two members pivotally connected at adjacent ends, one of said members being pivotally connected at its other end to said rocker at a second point offset from the said first point and the other of said members being pivotally connected at its other end to said frame, and means for moving said toggle linkage from one side to the other of dead center in timed relation to the rotation of said eccentric member so that said toggle linkage is at substantially dead center when said slide moves through its working stroke comprising a crank member rotatable about a fixed axis and operatively connected to said shaft for rotation thereby and a rod connecting said crank member and one of said members of said toggle linkage.

2. In a double action press, a frame, a die slide reciprocable in said frame, a blank holder reciprocable relative to said die slide, means to reciprocate said die slide along a line comprising a shaft supported by said frame for rotation about a fixed axis, an eccentric mounted on said shaft for rotation therewith about said fixed axis, an eccentric strap cooperating with said eccentric and having two connecting points offset from the center of the eccentric, means for rotating said shaft, a first link pivotally connected at one end to one of said connecting points and at the other end to said die slide, a second link pivotally connected at one end to said frame and at the other end to the other of said connecting points for constraining the said one connecting point to move through a closed elongated loop when said eccentric is rotated, the length of said loop being generally transverse to the line through the center of rotation of said eccentric and the connection of said slide to said first link whereby the die slide is moved in a direction away from said loop for substantially more than 180° of each revolution of said eccentric, and means for reciprocating said blank holder comprising a rocker pivotally connected to said frame, a second link pivotally connected at one end to a first point on said rocker and at the other end to said blank holder, a toggle linkage comprising two members pivotally connected at adjacent ends, one of said members being pivotally connected at its other end to said rocker at a second point offset from the said first point and the other of said members being connected at its other end to said frame, and means for moving said toggle linkage from one side to the other of dead center in timed relation to the rotation of said eccentric so that said toggle linkage is at substantially dead center when said slide moves through its working stroke comprising a crank on said shaft and a rod connecting said crank and said toggle member pivoted to said frame, said crank and said rod moving through dead center at substantially the same time said toggle linkage moves through dead center.

3. In a double action press, a frame; a reciprocable die slide; a blank holder reciprocable relative to said die slide, a pair of coaxially alined shafts extending along each of the opposite sides of said press, said pairs of shafts being disposed in the same plane and rotatably supported by said frame for rotation about fixed axes; a drive member fixed to the inner end of each of said shafts; drive means cooperating with said drive members for rotating said shafts; an individual drive linkage connecting each of said shafts to said die slide, each of said linkages comprising an eccentric crank member fixed to the corresponding shaft for rotation therewith, an eccentric strap cooperating with said eccentric member and having two connecting points, a fixed link pivotally connected at one end to one of said connecting points and at the other end to said die slide, a second link pivotally connected at one end to said frame and at the other end to the other of said connecting points and constraining the latter to move along a circular arc about the point of connection of the second link to the frame and constraining said one connecting point to move through a closed elongated loop when the corresponding shaft is rotated whereby the die slide is moved in its drawing stroke for substantially more than 180° of each revolution of said shaft; and a second individual linkage connecting each of said shafts to said blank holder to reciprocate the latter upon rotation of said shafts, each of said linkages comprising a crank member fixed to the outer end of the corresponding shaft, a rocker pivotally connected to said frame, a link pivotally connected at one end to a first point on said rocker and at the other end to said blank holder, a toggle linkage comprising two members pivotally connected at adjacent ends, one of said members being pivotally connected at its other end to said rocker at a second point offset from the said first point thereof and the other of said members being connected at its other end to said frame, and means for moving the toggle linkage from one side to the other of its dead center position in timed relation to the rotation of said eccentric member so that the toggle linkage is at substantially dead center when said slide moves through its working stroke comprising a rod connecting said crank member and the member of said toggle linkage pivoted to said frame, the crank and rod moving through dead center at substantially the same time that the toggle linkage, to which the rod is connected, moves through dead center.

References Cited in the file of this patent
UNITED STATES PATENTS

| | | |
|---|---|---|
| 1,964,900 | Alt | July 3, 1934 |
| 2,504,089 | Rode et al. | Apr. 11, 1950 |
| 2,522,747 | Byerlein | Sept. 19, 1950 |
| 2,550,063 | Johansen | Apr. 24, 1951 |
| 2,550,064 | Ward | Apr. 24, 1951 |
| 2,781,015 | Dehn et al. | Feb. 12, 1957 |